United States Patent
Turpin et al.

[11] Patent Number: 6,144,992
[45] Date of Patent: Nov. 7, 2000

[54] METHOD AND SYSTEM FOR CLIENT/SERVER AND PEER-TO-PEER DISK IMAGING

[75] Inventors: Kevin J. Turpin, Orem; Christopher P. Clark, Murray, both of Utah

[73] Assignee: Altiris, Inc., Lindon, Utah

[21] Appl. No.: 08/854,262

[22] Filed: May 9, 1997

[51] Int. Cl.[7] .............................. G06F 13/38; G06F 15/17
[52] U.S. Cl. ........................ 709/208; 709/221; 395/712
[58] Field of Search ........................ 395/200.5, 200.51, 395/200.52, 200.83, 200.38, 200.41, 200.67, 712, 653; 709/220, 221, 222, 253, 208, 211, 237; 713/100

[56] References Cited

U.S. PATENT DOCUMENTS

| | | | |
|---|---|---|---|
| 4,866,644 | 9/1989 | Burkhardt et al. | 364/900 |
| 4,872,006 | 10/1989 | Takao | 340/825.52 |
| 5,008,814 | 4/1991 | Mathur | 395/200.51 |
| 5,249,290 | 9/1993 | Heizer | 395/650 |
| 5,257,377 | 10/1993 | Sathi et al. | 395/712 |
| 5,325,527 | 6/1994 | Cwikowski et al. | 395/650 |
| 5,396,613 | 3/1995 | Hollaar | 395/575 |
| 5,421,009 | 5/1995 | Platt | 395/600 |
| 5,438,671 | 8/1995 | Miles | 395/200.83 |
| 5,452,459 | 9/1995 | Drury et al. | 395/700 |
| 5,459,837 | 10/1995 | Caccavale | 395/184.01 |
| 5,461,721 | 10/1995 | Cormier et al. | 395/275 |
| 5,465,351 | 11/1995 | Lemmo | 395/600 |
| 5,491,694 | 2/1996 | Oliver et al. | 370/85.4 |
| 5,495,611 | 2/1996 | Bealkowski et al. | 395/700 |
| 5,506,902 | 4/1996 | Kubota | 380/9 |
| 5,513,126 | 4/1996 | Harkins et al. | 364/514 A |
| 5,513,314 | 4/1996 | Kandasamy et al. | 395/182.04 |
| 5,515,508 | 5/1996 | Pettus et al. | 395/200.01 |
| 5,515,510 | 5/1996 | Kikinis | 395/200.02 |
| 5,517,645 | 5/1996 | Stutz et al. | 395/700 |
| 5,517,668 | 5/1996 | Szwerinski et al. | 395/800 |
| 5,522,041 | 5/1996 | Murakami et al. | 395/200.01 |
| 5,526,490 | 6/1996 | Nishikawa | 395/200.06 |
| 5,528,757 | 6/1996 | Yamasaki | 395/200.03 |
| 5,537,533 | 7/1996 | Staheli et al. | 395/182.03 |
| 5,537,585 | 7/1996 | Blinkenstaff et al. | 395/600 |
| 5,542,046 | 7/1996 | Carlson et al. | 395/186 |
| 5,754,863 | 5/1998 | Reuter | 395/712 |
| 5,828,887 | 10/1998 | Yeager et al. | 395/200.5 |

*Primary Examiner*—Mark H. Rinehart
*Attorney, Agent, or Firm*—Lloyd W. Sadler

[57] ABSTRACT

A method and system for imaging data between two or more digital computers across a computer network is described, where the digital computers transfer data in a peer-to-peer mode and/or a client/server mode upon command of the operator. This invention address the problem of managing, updating and installing executable software, such as operating systems, utilities and application software packages on a large number of networked computer systems. By using this invention properly, a system operator can transfer data stored on a single computer system to all or some of the computer system connected to the first system over a computer network and can do so without expensive electronic server equipment. Moreover, this invention provides the capability of transferring data as files, sectors or cylinders of disk media, thereby permitting a single operator to, through a generally automated procedure, simultaneously install new system software, configuration files and executive files on many computers. This invention provides an important improvement in the operation, maintenance and control of large computer networks, although it applies and works equally well in small network applications. In its best mode of operation this invention is performed on standard digital computer systems through the use of special purpose computer software.

12 Claims, 15 Drawing Sheets

Microfiche Appendix Included
(2 Microfiche, 108 Pages)

METHOD AND SYSTEM FOR CLIENT/ SERVER AND PEER-TO-PEER DISK IMAGING

BACKGROUND OF THE INVENTION

1. Field of the Invention

This invention relates to the systems and methods for copying or mirroring the binary data on one computer hard disk drive over a computer network to one or many other computer hard disk drives. More specifically, this invention provides a process or method for installing and/or distributing software from one computer system to one or more other computer systems over a computer network. Furthermore, this invention provides a system for solving the often tedious problems of installing computer software and distributing computer system files to a number of computer systems, providing a mechanism for fast software distribution on networked computers by eliminating the need to use the installation utilities of each application program to install the software package individually on each computer.

2. Description of Related Art

It is commonly known in the related art to transfer computer files from one computer hard disk to another computer hard disk. Similarly, it is well known to transfer files from computer to computer over a computer network. Likewise, computer network vendors have created tool sets, for use in their own labs, to transfer data from a master computer disk drive to an image file on a file server and then to download the data to the target or slave computers. Other existing tools will use the file server to broadcast data from an image file to the target or slave computers simultaneously (in parallel). Examples of these tools have been disclosed at conferences and with customers by Novell, Inc.

This invention has substantial and important advantages over prior known approaches. This invention not only can use a client/server model, it can also use a peer-to-peer model not available with computer network vendor tool sets or prior used disk-to-disk copying. Unlike, prior approaches, this invention can be used without a network file server and still can copy computer data from one computer hard disk to many computer hard disks over a computer network, by using the peer-to-peer mode of operation. Moreover, the peer-to-peer mode of operation provides important advantages in terms of transfer speed and lower cost. The speed advantage is realized by using a one step process rather than the two step process required for the client/server model of operation. In the invention's peer-to-peer mode, the data is distributed from the master computer to the slave computers in a single step. The cost advantage is achieved by not requiring a network file server to accomplish the one to many data imaging. Network file servers are costly to purchase, install and maintain.

For general background art the reader is directed to U.S. Pat. Nos. 4,866,664, 4,872,006, 5,249,290, 5,325,527, 5,396,613, 5,421,009, 5,438,671, 5,452,459, 5,459,837, 5,461,721, 5,465,351, 5,491,694, 5,495,611, 5,506,902, 5,513,126, 5,513,314, 5,515,508, 5,515,510, 5,517,645, 5,517,668, 5,522,041, 5,526,490, 5,528,757, 5,537,533, 5,537,585, 5,542,046 each of which is hereby incorporated by reference in its entirety for the material disclosed therein.

U.S. Pat. No. 4,866,664 discloses an interprocessor message communication synchronization apparatus and method for a plurality of processors connected to a system bus where one processor desiring to send a control signal to another processor, broadcasts an input/output write instruction on the system bus along with the address of the receiving processor and a data field representative of the control signal to be transmitted.

U.S. Pat. No. 4,872,006 discloses a data transmission system in which data are transmitted among plural stations.

U.S. Pat. No. 5,249,290 discloses a method of and apparatus for operating a client/server computer network to access shared server resources in response to service requests from client computers connected to the network.

U.S. Pat. No. 5,325,527 discloses a client/server communication system utilizing a self-generating nodal network wherein the method includes the steps of creating a server nodal network tree which includes the steps of generating a server root node which includes both process steps for communicating to an operating system and service nodes, and process steps for building service nodes which correspond to servers within the client/server system, each service node include both process steps for advertising a service to the server root node and process steps for building a topic node which includes both process steps for accessing a server and process steps for building a job node for storing a job request.

U.S. Pat. No. 5,396,613 discloses a method for error recovery in client/server distributed processing systems using cascaded servers.

U.S. Pat. No. 5,421,009 discloses a method for remote installation of software over a computer network, allowing the user to interactively select each remote computer system for software installation, or to provide a file containing a list of all remote computer systems.

U.S. Pat. No. 5,438,671 discloses a two-computer system and method where data is transferred between the computers as complete disk images rather than as files.

U.S. Pat. No. 5,452,459 discloses a method and apparatus for allocating server access in a distributed computing environment using a scheduling process.

U.S. Pat. No. 5,459,837 discloses a method and system for monitoring the performance of servers across a network and for suggesting an appropriate server to a client requesting a service, wherein a plurality of probes are placed in various clients in the network by a Broker-Performance Mechanism.

U.S. Pat. No. 5,461,721 discloses a system for transferring data between input/output devices and main or expanded storage under dynamic control of independent indirect address words.

U.S. Pat. No. 5,465,351 discloses a method and system for memory management of a client/server computing network.

U.S. Pat. No. 5,491,694 discloses an apparatus and method for establishing "virtual connections" through a packet switched data communications network, the network including a plurality of end systems and switches connected by links, to allocate a shared resource among competing devices.

U.S. Pat. No. 5,495,611 discloses a method and apparatus for dynamically loading an ABIOS device support layer in a computer system.

U.S. Pat. No. 5,506,902 discloses a data broadcasting system for the low-cost delivery of character-heavy data such as newspapers and magazines.

U.S. Pat. No. 5,513,126 discloses a method for a sender to automatically distribute information to a receiver on a network using devices and communication channels defined in the receiver profiles.

U.S. Pat. No. 5,513,314 discloses a fault tolerant NFS server system and mirroring protocol for the retrieval of data files including a client system connected to a data communication network.

U.S. Pat. No. 5,515,508 discloses a object-oriented client/server facility (CSF) and networking service facility (NSF) interfacing between application programs residing in client and server nodes of a distributed services network.

U.S. Pat. No. 5,515,510 discloses a communications internetwork system connecting a client node array to a resource array.

U.S. Pat. No. 5,517,645 discloses a method and system for managing the connection of client components to an interface implemented by a sever component.

U.S. Pat. No. 5,517,668 discloses a distributed computing system having a distributed protocol stack.

U.S. Pat. No. 5,522,041 discloses a data processor and a data transfer method for efficiently transferring data between a plurality of information processing devices as in a client server system.

U.S. Pat. No. 5,526,490 discloses a data transfer control unit using a control circuit to achieve high speed data transfer.

U.S. Pat. No. 5,528,757 discloses a communication network system in which a plurality of information processing equipments are connected with a communication line for communication of a message.

U.S. Pat. No. 5,537,533 discloses a system for remote mirroring of digital data from a primary network server to a remote network server, which includes a primary data transfer unit and a remote data transfer unit which are connected one with another by a conventional communication link.

U.S. Pat. No. 5,537,585 discloses a data storage management system for networked interconnected processors, including a local area network and a storage server.

U.S. Pat. No. 5,542,046 discloses a peer to peer connection authorizer which includes a system authorizer mechanism, a client connection manager, and a server connection manager.

None of these prior related art references discloses a system for imaging (or mirroring) binary data from one computer hard disk drive over a computer network to one or many other computer hard disk drives either through a client/server mode or a peer-to-peer mode, to provide a mechanism or process for rapid software distribution on networked computers which eliminates the necessity of using each application's install utility individually on each computer.

MICROFICHE APPENDIX

This specification includes a Microfiche Appendix which includes 2 pages with a total of 108 frames. The microfiche appendix includes computer source code of one preferred embodiment of the invention. In other embodiments of the invention the inventive concept may be implemented in other computer code, in computer hardware, in other circuitry, in a combination of these or otherwise. The Microfiche Appendix is hereby incorporated by reference in its entirety and is considered to be a part of the disclosure of this specification.

SUMMARY OF THE INVENTION

It is desirable to provide a method and system for installing computer software and computer data files on more than one computer simultaneously, over a network, where the method can function upon user command either under a client/server model or a peer-to-peer model of operation.

Accordingly, it is the primary object of this invention to provide a process for installing computer application programs on multiple computer systems simultaneously over a computer network.

It is a further object of this invention to provide a process for mirroring data files on multiple computer systems simultaneously over a computer network.

It is further object of this invention to provide a method for copying binary computer data from one computer hard disk drive to one or more other computer hard disk drives, which does not require the use of a computer file server.

It is a further object of this invention to provide a system for mirroring computer data from one computer disk drive to another computer disk drive in a peer-to-peer computer communications model.

It is a further object of this invention to provide a system for mirroring computer data from one computer disk drive to another computer disk drive in a client/server computer communications model.

It is a further object of this invention to provide a method for mirroring computer data between one computer disk drive to another computer disk drive that permits the user to select between a client/server and peer-to-peer computer communications.

It is a further object of this invention to provide a method and system for mirroring computer data from disk drive to disk drive that improves the cost performance of client/server systems available in the art.

It is a further object of this invention to provide a computer data mirroring system that incorporates data compression.

It is a further object of this invention to provide a computer data imaging system that has the capability of imaging a single disk partition, multiple disk partitions, or the entire hard disk, from one computer hard disk to one or more other computer hard disks simultaneously.

Additional objects, features and advantages of this invention will become apparent to persons of ordinary skill in the art upon reading the remainder of the specification and upon referring to the attached figures.

These objects are achieved by a set of two computer programs, referred to by the inventor as IMGBLSTR and IMGSLAVE. The IMGBLSTR program is the primary control program while the IMGSLAVE program is used for listening for data from the IMGBLSTR program across the network and writing such data to the local disk drive.

The IMGBLSTR program operates in five modes of operation. These are:

1. IMGBLSTR reads the data from the disk drive of the master computer, compresses the data, and writes it (uploads it) to an "image file" resident on a network file server. This is the client/server model or mode of operation.

2. In connection with performing mode 1 above, IMGBLSTR broadcasts (simultaneously sends in parallel) the data that is being uploaded to the image file on the network to all computers running the IMGSLAVE program. This mode of operation is a combination of client/server and peer-to-peer.

3. IMGBLSTR reads the data from the local computer disk drive and broadcasts it on the wire (network) to computers running the IMGSLAVE program. The IMGBLSTR program does not upload the data to an image file on a network file server, rather the data goes directly to the slave computers running the IMGSLAVE program. This is the peer-to-peer mode of operation.

4. IMGBLSTR reads the data from an image file located on a network file server, decompresses it, and writes it to its own local computer hard disk drive. This the download process for the client/server model.

5. While performing operation mode 4 above, IMGBLSTR broadcasts the data that is being downloaded from the image file on the network to all computers running the IMGSLAVE program. This is a combination client/server and peer-to-peer mode.

The IMGBLSTR program determines which mode to use through either a series of menu options presented to the operator, or through commands from the operator entered on the command line when the program is launched.

The IMGSLAVE program operates in only one mode of operation. Specifically, it opens a communication socket on the network, listens for data received on that socket, and then processes the data received on the socket. Each packet of data received on the socket contains a command field which tells IMGSLAVE what the data contained in the packet is used for and how the data is to be processed. The commands in the command field are:

| Command | Performed by | Function |
| --- | --- | --- |
| Drive Geometry | Master | Compare geometry of master image with slave |
| RSVP | Slave | Response to master to indicate participation in download |
| Conform Download | Master | Acknowledgment that slave has joined the process and that master knows slave is ready |
| Sector Data | Master | Write data to receive buffer |
| Sector Data & Flush | Master | Write data to receive buffer and flush data to disk |
| Skip Track | Master | No data in current track - Skip this track |
| Resend Request | Slave | Slave missed data - Please resend |
| End of Data | Master | Master is finished sending data - Ready for a slave request |
| Done | Master | Image complete - Exit program |
| Disconnect | Slave | Slave response to master "done" command - Slave disconnecting |
| Disconnect Acknowledge | Master | Master acknowledges slave disconnect |

Current source code for both the IMGBLSTR and the IMGSLAVE programs are included and listed in the Microfiche Appendix included with this patent application.

DETAILED DESCRIPTION OF THE INVENTION

Figure 1:
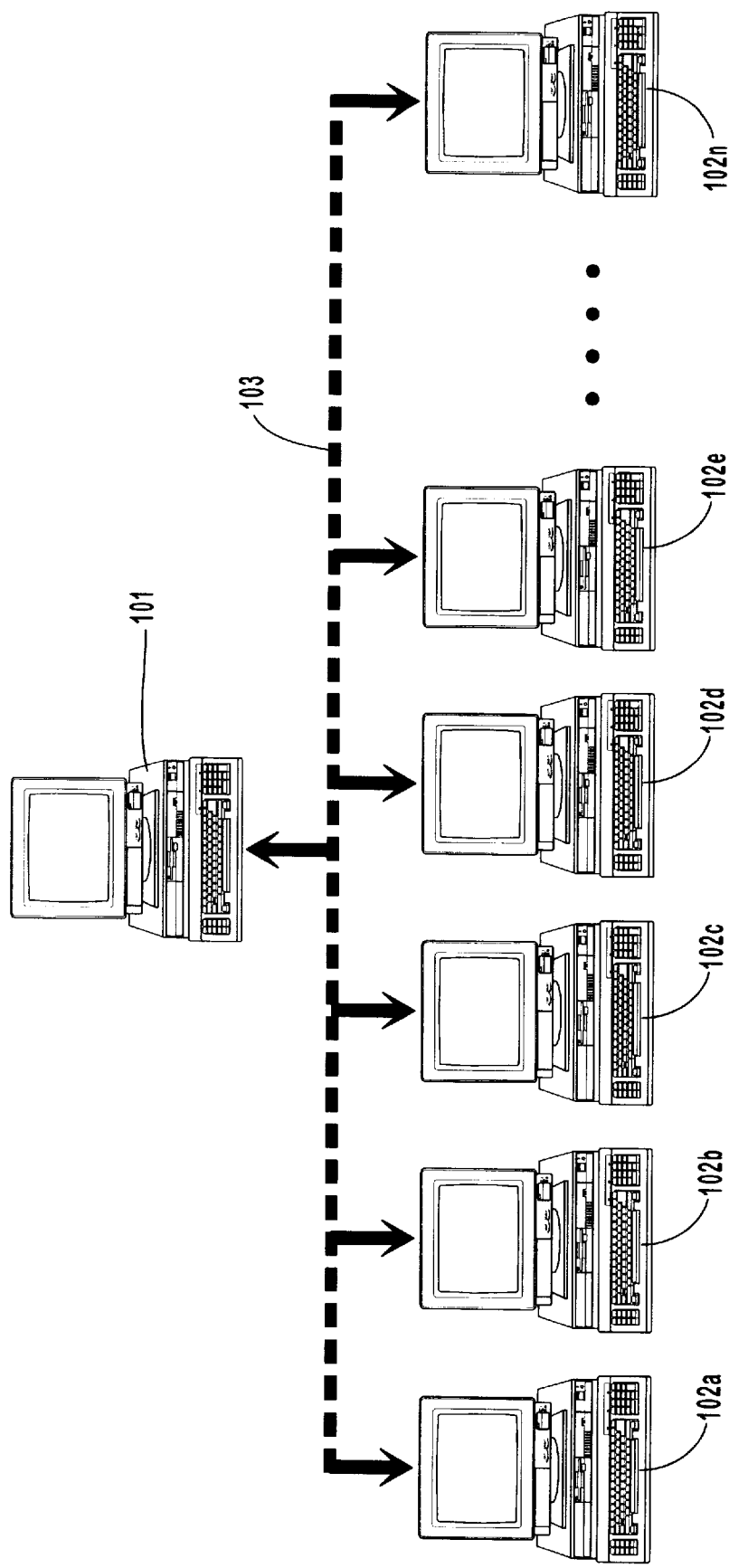
FIG. 1 depicts a system diagram of a computer network having a source (master) computer and a number of destination (slave) computers connected to each other electronically.

FIG. 1 shows a computer network having a source (master) computer 101 and a number of destination (slave) computers 102a, 102b, 102c, 102d, 102e, 102n connected to each other electronically as may be used in the peer-to-peer mode of operation of the invention. A typical stand-alone computer may include the following components: a processor; internal memory; a disk storage device; a display device; and an input device. The electrical connection 103 provides a communication channel between the computer systems. The use of this invention does not require that the connection between the computer systems, as designated 103, necessarily be electrical. Other alternative methods of conductivity include, fiber optical, RF, and/or light wave transmission and detection. Often these types of communications channels are referred to as "networks," "local-area-networks" (LANs), and "wide-area-networks" (WANs). Typically, each computer is capable of operating as a stand-alone system. With the addition of the electrical connection 103 the computers are also capable of sharing information (for example data files and e-mail). The applicants' present invention extends the capabilities of individual computer systems connected over a computer network by providing disk imaging from one computer to another computer over a network. Such disk imaging provides a solution to the problem of installing, backing up, maintaining, and upgrading of computer operating system software, computer system utility software, and application programs. This invention, which operates either with or without a computer network server, permits a single computer system to be designated as a "master" and to transfer data from its disk drive or drives to one, some or all of the other computers on the network, designated as "slaves."

Figure 2:
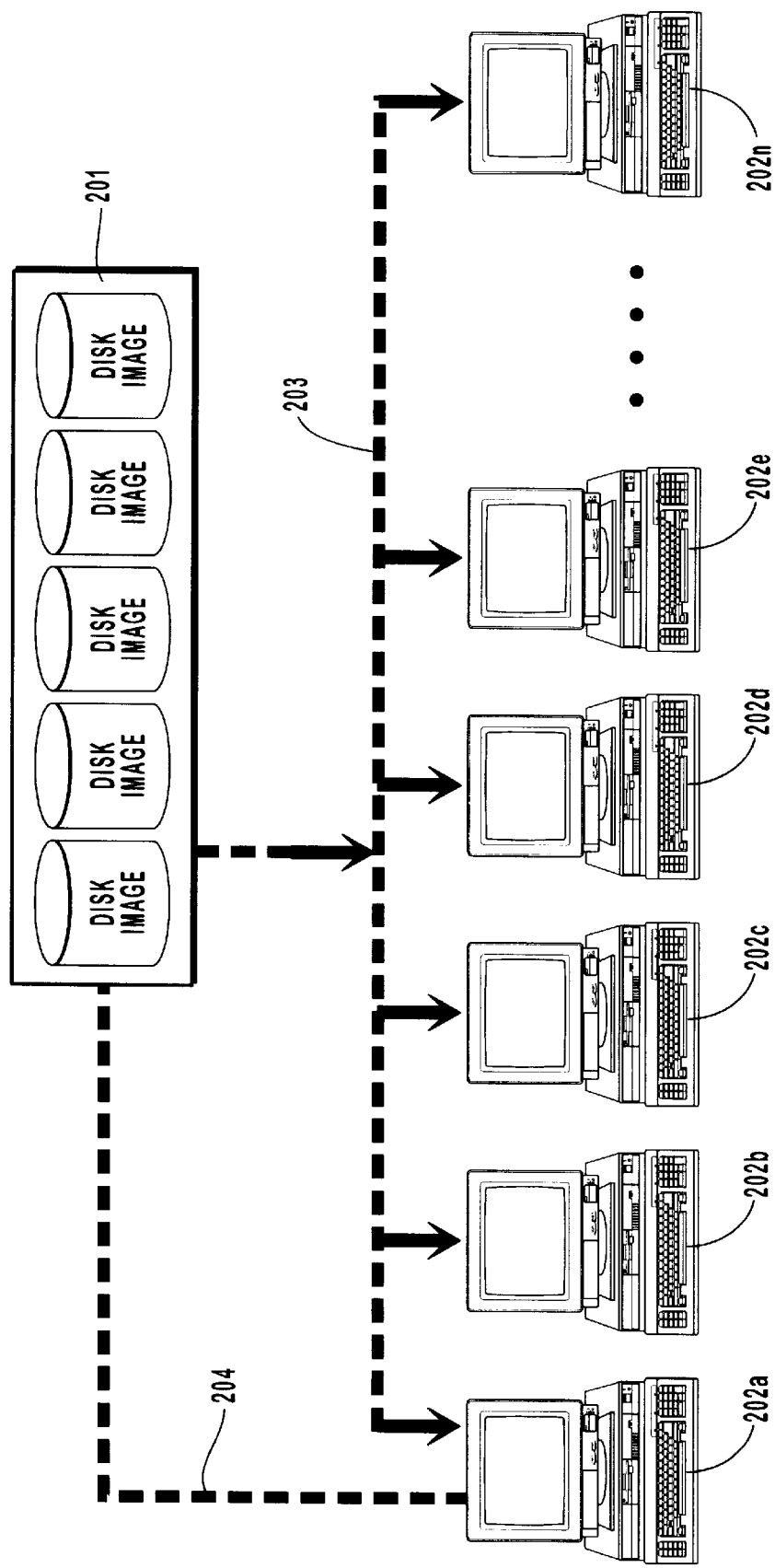
FIG. 2 depicts a system diagram of a computer network using the prior approaches utilizing client/server modes of operation for transferring data from one computer to other computers across a network.

FIG. 2 depicts a system diagram of a computer network employing the traditional network server hardware 201. This system is well known for providing a method of transferring data to and from the network server and from and to the individual computers on the network. These prior approaches, typically are referred to as "client-server" systems. In a traditional client-server system, data is transferred from a client computer 202 to the network server 201, or is transferred from the server 201 to one or more of the client computers. While applicants' invention supports client-server network systems, the most important achievement of this invention is that it provides the capability of transferring data, files, and disk sectors from any computer on the network to any other computer on the network with or without a network server, thereby dramatically decreasing the difficulty and complexity of computer network management. Where a network server 201 is employed in the network the "master" computer 202a is provided with the capability of transferring data either to the network server 201 and/or to one or all of the "slave" computers 202b, 202c, 202d, 202e, . . . , 202n. This inventions supports networks utilizing client/server modes of operation for compatibility with existing networks. It also supports and provides peer-to-peer operation to permit network management without the considerable expense of network server hardware and simultaneously providing a significant improvement in data transfer efficiency across a computer network.

In its best mode of operation, the present invention operates through coordinated use of two computer system communications programs: IMGBLSTR and IMGSLAVE. IMGBLSTR is designed to operate on the "master" computer, while IMGSLAVE is designed to operate on the "slave" computer. In the current preferred embodiment of the invention each program is written in the C programming language and operates on a DOS operating system. However, other equivalent embodiments of the invention may be created in other computer languages, including but not limited to C++, Pascal, and assembly code, and may be designed to operate on other computer operating systems, including but not limited to UNIX, Windows and MacIntosh. The following discussion of the steps of the process of this invention correspond to programs, sub-programs, and routines in IMGBLSTR and IMGSLAVE best mode of the invention. Following this discussion of the essential steps of this process is a complete list of the source code for each program. This source code is provided as part of this disclosure, to provide a fully enabling description of the invention. It is suggested that the reader refer to this source code for additional detailed description as the reader reviews the following figure by figure discussion of the process of the invention.

The following description of the top level state diagrams of the "master" computer and the "slave" computer is provided to give the reader an overview of the handshaking and data processing process of the invention. A detailed breakdown of each subprocess, task or program is given in the later detailed descriptions of the process flow charts and the best mode of operation of the invention is provided in the listing of software source code included in this description following the description of the detailed subprocesses, tasks, and/or programs.

Figure 3:
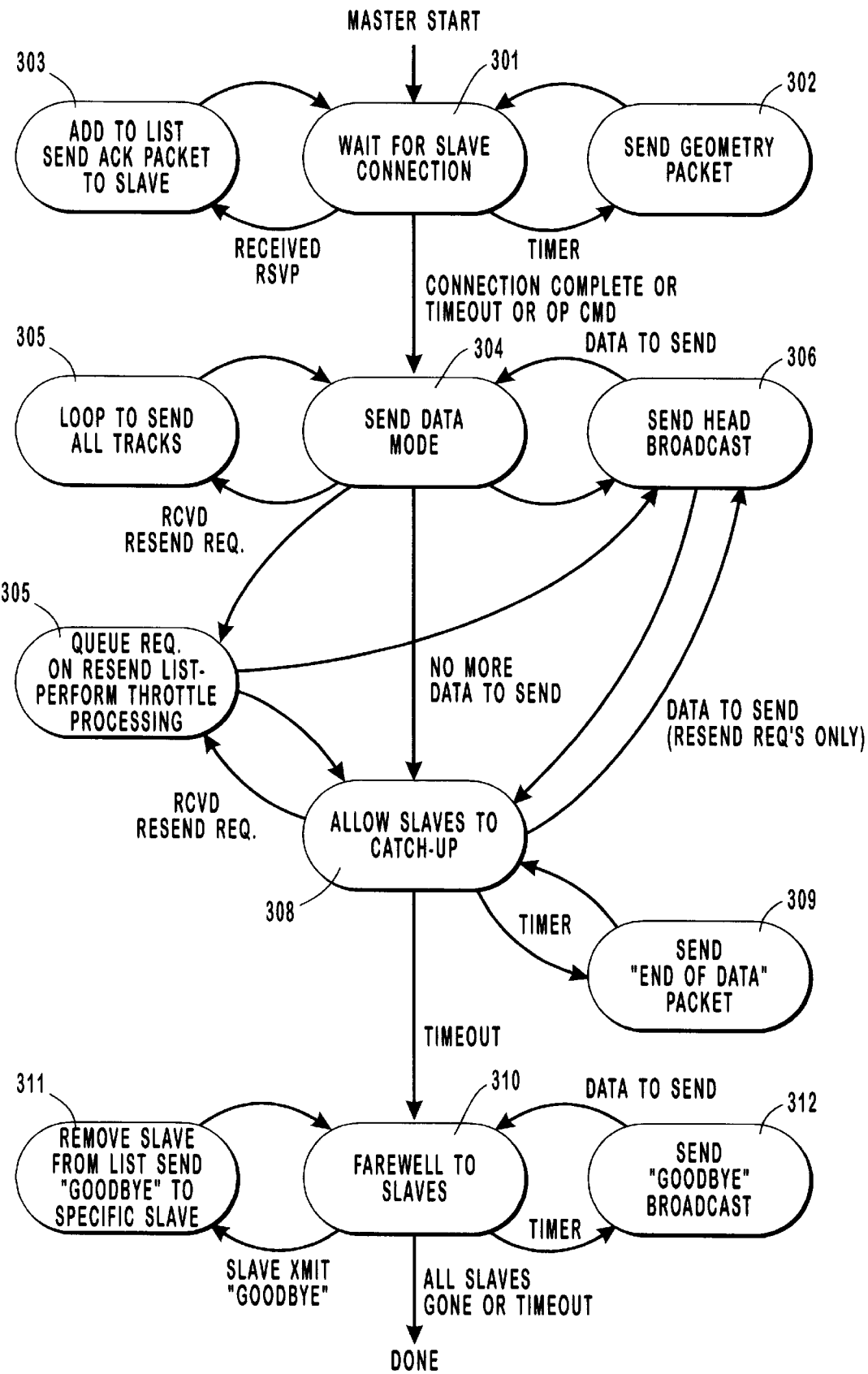
FIG. 3 depicts the top level state diagram of the master computer ("IMGBLSTR") program/process component of the invention.

FIG. 3 depicts the top level state diagram of the master computer ("IMGBLSTR") program/process component of the invention. The master computer process begins by entering the Wait for Slave Connection state 301. In this state 301 the master computer is initialized for communication with slave computers. The process goes from state 301 to state 302 when the master computer broadcasts its disk drive geometry to the slave computers. In this Send Geometry Packet state 302 the master computer sends the master computer drive geometry to slave computers on the send IPX socket. The "currently connected clients" display is initialized. Geometry packets are sent periodically to the slave computers. Geometry packets, in the preferred embodiment of the invention, include the following disk drive information for the master local disk drive: maximum cylinders; maximum heads; maximum sectors, image file partition start cylinder; and image file partition end cylinder. Geometry packets also include information on the IPX network sockets, including: the network address; the node address; and the socket number. Error conditions are monitored and the master computer waits for RSVP packets from the slaves. When the master computer receives an RSVP from the slave the master adds the slave (or client) to its list and send an ACK packet to the slave 303. When the connection between the master and one or more slaves is either completed, terminated by an operator command, or terminated by a timeout, the master process goes to the Send Data Mode state 304. The Send Data Mode state 304, in combination with the Send Head Broadcast state 306 and the Loop to Send All Tracks state 305, performs the upload image, broadcast head, broadcast skip head, broadcast given head, and the send IPX packet tasks. In the event that a Resend Request is received the process goes from the Send Data Mode state 304 to the Queue Req. On Resend List— Perform Throttle Processing 307. During this state, incoming packets are processed, resend requests are processed by servicing the resend queue by sending data packets to slaves, resend requests are recorded, the resend list is processed and tracks are re-transmitted. These tasks are processed in conjunction with state 306. In the event that no more data remains to be sent, the process moves to the Allow Slaves to Catch-Up state 308. This state finishes processing of broadcasts and handles late resend requests. The transition of the process from state 308 to state 309 is accomplished as follows: (1) a timer indicates it is time to send a packet; (2) a packet of data is sent 309; and (3) the process returns automatically to state 308 to wait for the next timer indication. Thus, when the timer has run, the process moves from the Allow Slaves to Catch-Up state 308 to Send "End of Data" Packet state 309, which sends farewell broadcast packets, and back to state 308. When the transfer is complete (when a timeout occurs), the process moves to the Farewell to Slaves state 310, which in combination with the Send "Goodbye" Broadcast state 312 and the Remove Slave From List Send "Goodbye" to Specific Slave state 311, performing the say Goodbye to Slaves and Processing Image Packets tasks.

Figure 4:
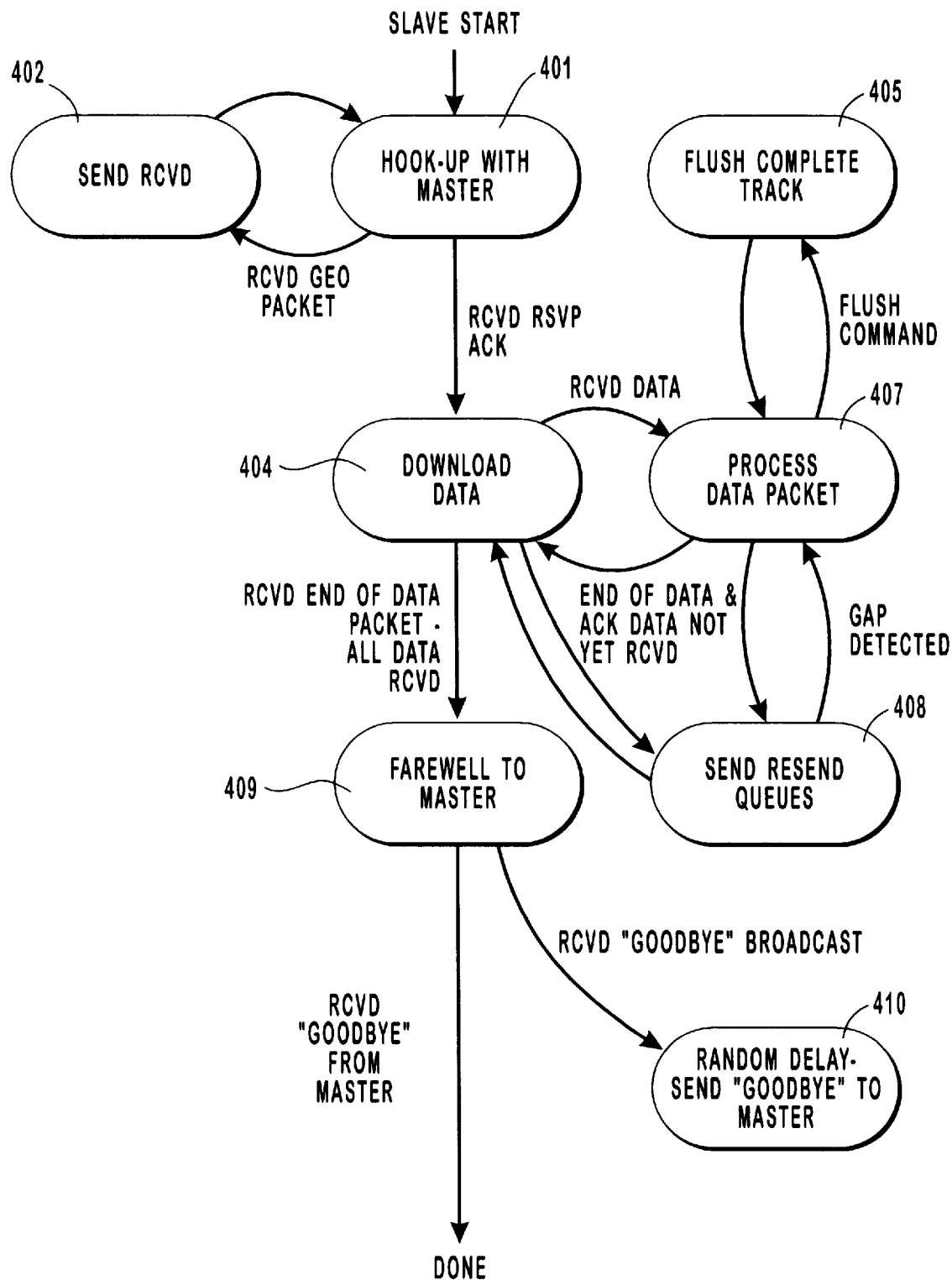
FIG. 4 depicts the top level state diagram of the slave computer ("IMGSLAVE") program/process component of the invention.

FIG. 4 depicts the top level state diagram of the slave computer ("IMGSLAVE") program/process component of the invention. Beginning with the Hook-Up with Master state 401 the slave computer attempts to form a communications link with the master computer. After a geometry packet is received from the master, the slave process moves to the Send RSVP state 402, where the slave checks the disk drive geometry for compatibility and acknowledges receipt of the geometry information with an RSVP. After the slave process receives a RSVP acknowledge from the master, the process enters the Download Data state 404. Data is received via transitioning between the Download Data state 404 and the Process Data Packet state 407. The Process Data Packet state 407 processes the received data by checking to see if the head is at a valid position, and storing the received data in a buffer. A test is performed to determine if the designated slot is not empty, wherein a "lost data" resend request is sent. The process of the invention provides the capability of sending resend requests through the Send Resend Request state 408. If a "flush" packet is received (a "flush" packet is a special type of data packet, containing an attribute to indicate that when the data is copied to the image file, that the image file should then be flushed to disk), the Flush Complete Track state 405 is entered, where if the buffer is complete, it is written to disk and the "good upto" track is updated, removing the track from the "missing list." If the buffer is incomplete, this state 405 sends a "lost data" resend request and adds the track to the "missing list." When the transfer of data is complete, a "End of Data" packet is received from the master, leading the slave process to the Farewell to Master state 409, where once a "goodbye" is received from the master, the Random Delay—Send "Goodbye" to Master state 410 is entered to send a "goodbye" is send to the master. Thereby, finishing the slave process.

Figure 5:
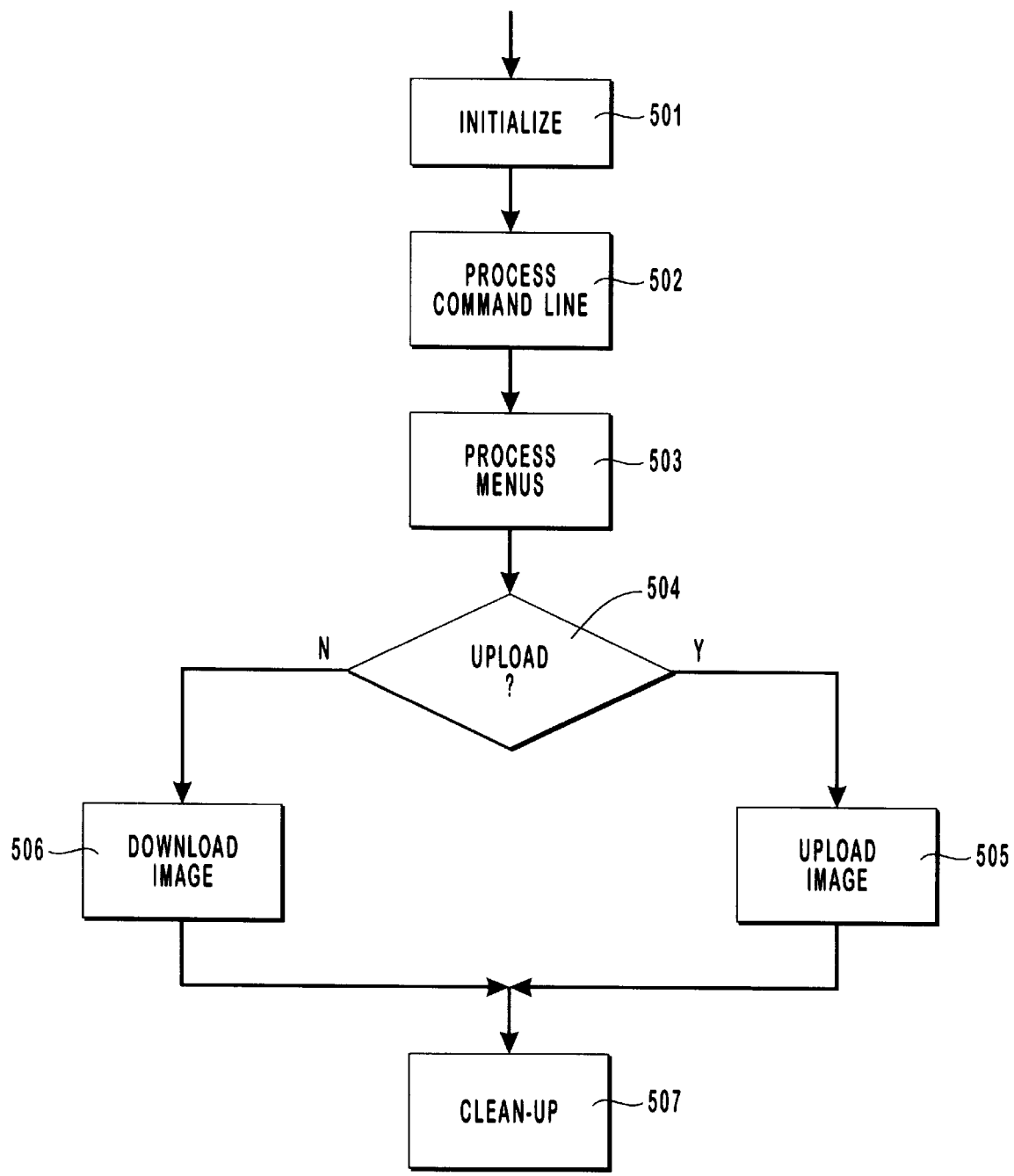
FIG. 5 depicts the top level process flow chart of the master computer component of the invention.

FIG. 5 depicts the top level process flow chart of the master computer component of the invention. In its current best mode of operation, the process of this invention begins with the initialization 501 of the master. During this initialization step 501 the user license is verified, usage parameters are checked the MAC address of the computer is acquired and displayed, the local drive geometry is retrieved, all needed buffers are allocated, and the number of hard disk drives installed in the computer is determined. Next, the command line process step is performed 502, where the command line is parsed, setting flags and/or calling the functions to process each command. Next, menus are processed 503. The process menu step calls other functions to get needed information for the execution of the program. A test is made as to whether the process is required to upload data ("image") to a slave or download data ("image") 504. If the process is required to upload data then the upload image step 505 is performed to upload the image, drive data, to the image file. If the process is not required to upload data then the download image step 506 is performed, which accomplishes the downloading of the image (drive data). If a file name was specified by the operator, it is opened and the drive data is read from the file. Lastly, the clean-up step 507 is performed to reset all affected computer systems on the network.

Figure 6:
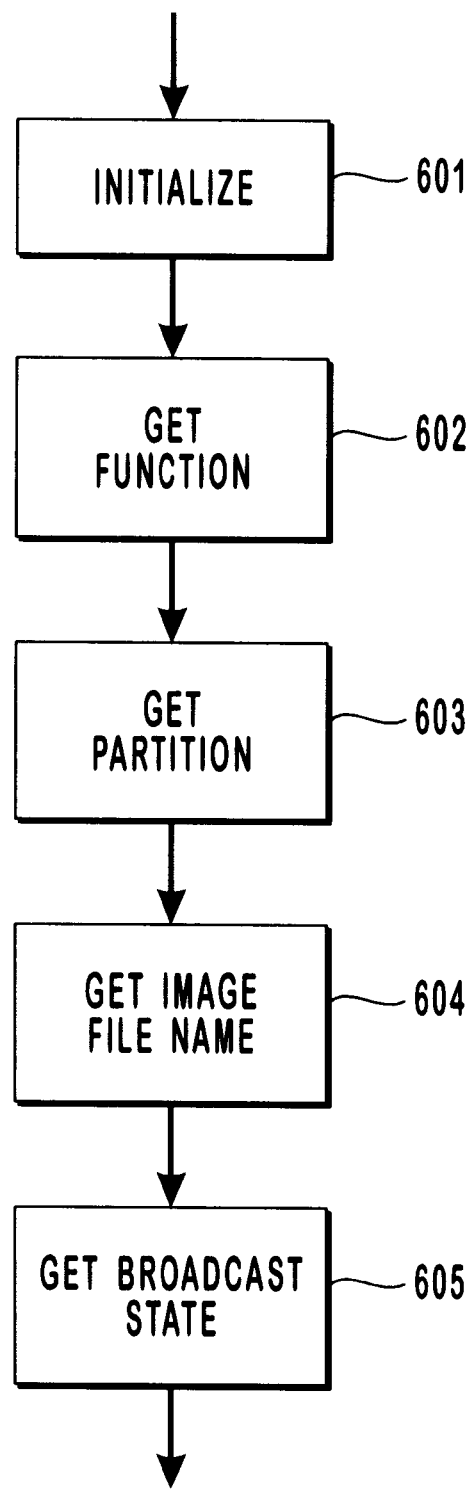
FIG. 6 depicts the detailed flow diagram of the process menus steps of the master computer component of the invention.

FIG. 6 depicts the detailed flow diagram of the process menus steps of the master computer component of the invention. The process menus program process calls other program and/or functions to get the needed information for the process of the invention. Where the requested information has already been entered on the command line, the associated menu is not displayed. First, the program variables are initialized 601. Next, the desired process function is requested 601, allowing the operator to specify whether the operator wants to upload or download. Next, the get partition 603 step is performed to display the local drive partition table and to allow the operator to specify the partition to be imaged. The next step is to get the image file name 604, during which the operator is prompted to provide the name of the image file, including the complete path. Next, the broadcast state is requested 605, that is, whether the operator wants to send the drive data to other slave computers via broadcast packets.

Figure 7:
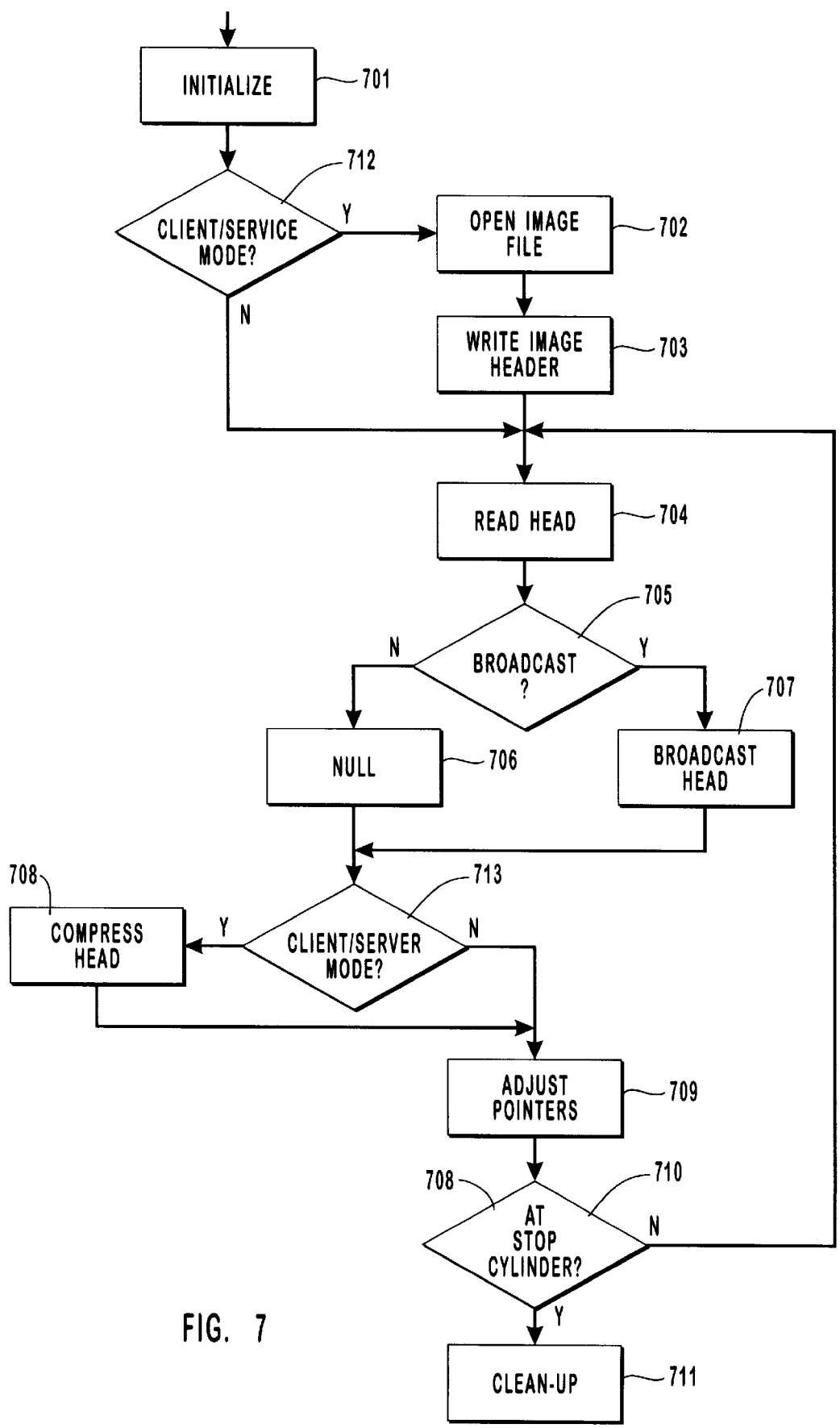
FIG. 7 depicts the detailed flow diagram of the upload image step of the master computer component of the invention.

FIG. 7 depicts the detailed flow diagram of the upload image step of the master computer component of the invention. The upload image program process performs the function of uploading the image (drive data) from a master computer to a network server computer and/or, if the broadcast feature is enabled, broadcasting the data to the image slave computers on the network. Initially, upload image program is initialized 701. This initialization step is necessary to provide needed data. A test 712 is made to determine whether the invention is operating in the client/server mode. If it is, an image file is opened 702 and an image header is written 703. The drive head buffer is read 704. A test is performed to determine whether the data is to be broadcast 705 to multiple slave computers. If the data is to be broadcast the broadcast is performed 707, if not the process passes through the null state 706 before once again testing to determine if the process is in the client/server mode 713. If it is, the data is compressed and written to a file 708. Data compression is accomplished, currently by a "Run-Length Encoding" scheme well known in the art. Next, System pointers are incremented 709 and if the system has not reached the stop cylinder 710 the process continues to read the head buffer 704, broadcasts the data 707, compresses the data, and adjusts the system pointers. After the stop cylinder is reached 710, the process performs the clean-up step 711 by closing files, resending missed tracks and saying "goodbye" to slave (client) computers.

Figure 8:
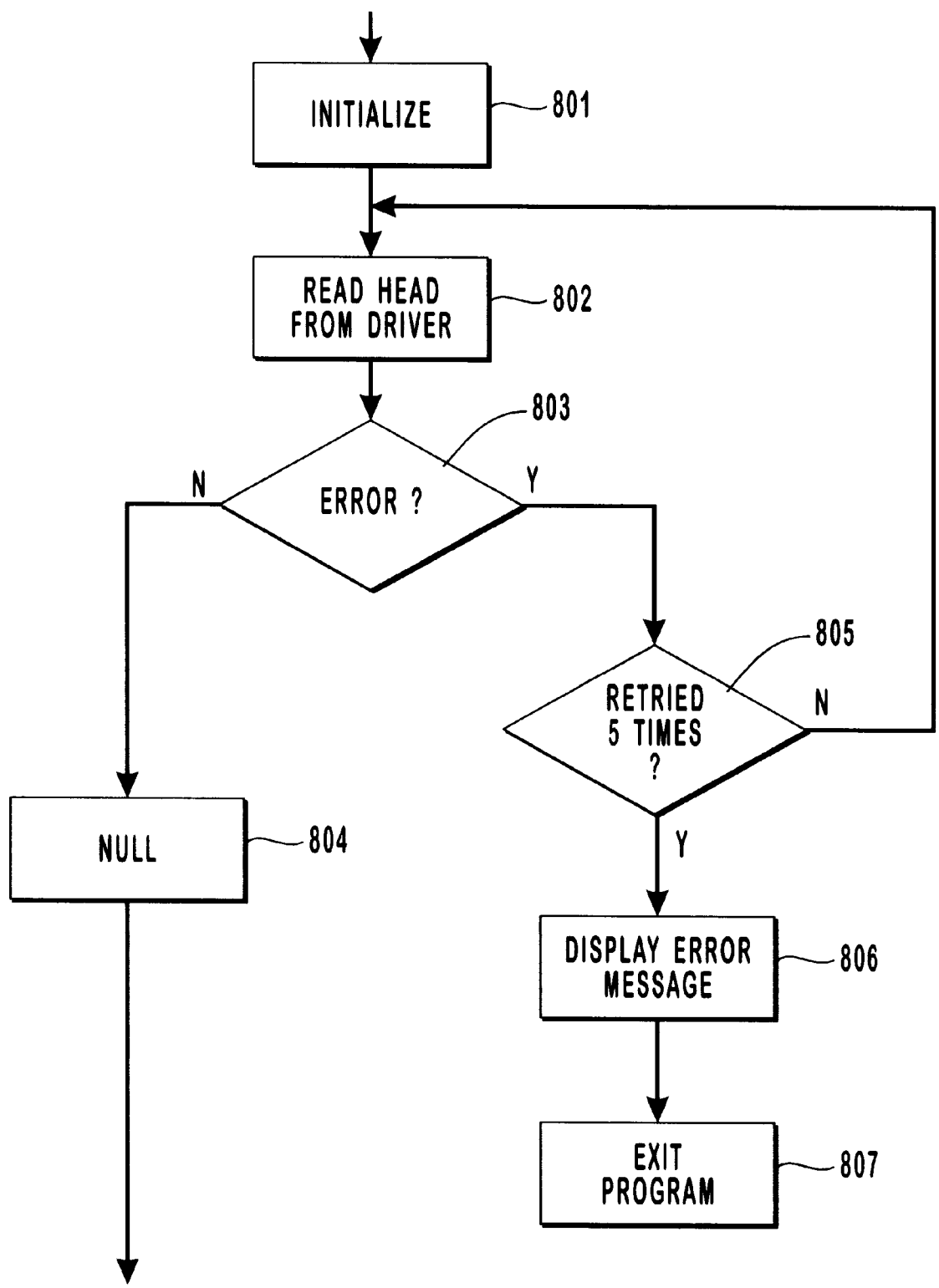
FIG. 8 depicts further detail of the read head step of the upload image section of the master computer component of the invention.

FIG. 8 depicts further detail of the read head step of the upload image section of the master computer component of the invention. This program step reads a head worth of data from a selected local hard disk drive at the current cylinder and current head location. Errors that are encountered, are reported. The process of the invention is aborted after five retries on errors. However, because CRC type errors are recoverable, they will not count towards aborting the process. First, this sub-process is initialized 801, providing access to the necessary variables. Next, the data in the designated current head is read 802. If a read error occurs 803 the read of head data is attempted again, up to five times 805. If errors continue beyond five tries 805 an error message is displayed 806 and the program is exited 807. Otherwise, if the data is read without error then the process passes through the null state 804 and the program returns to the upload image process step 505 as shown in figure seven.

Figure 9:
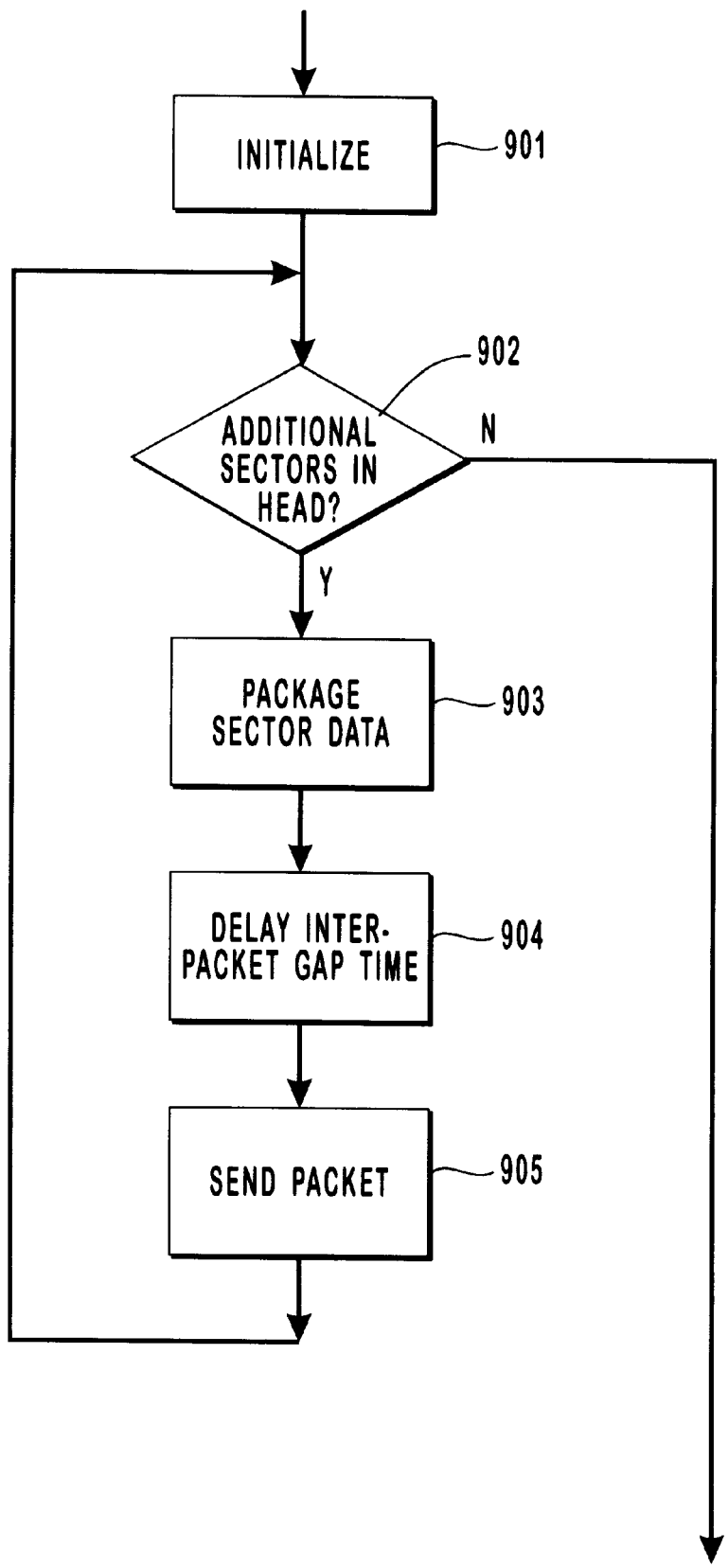
FIG. 9 depicts further detail of the broadcast head step of the upload image section of the master computer component of the invention.

FIG. 9 depicts further detail of the broadcast head step of the upload image section of the master computer component of the invention. The function of the broadcast head program—subprocess is to broadcast the drive head data (headbuffer) to the image slaves using the send IPX socket. Data is sent 512 bytes at a time, equal to a single sector of disk data. On the last sector sent, the command to flush the data, that is, to write it to the hard drive, is sent. The first step in the broadcast head process is to initialize the data for broadcast 901. The process of sending packets of data 905 is performed one sector at a time. After it is determined that an additional sector of data is in the head 902, the sector data is packaged 905 or prepared for broadcast, a delay is provided 903 to insure correct interpacket data broadcast, then the packet is sent 905. The broadcast head process is finished when no further sectors remain for transfer.

Figure 10:
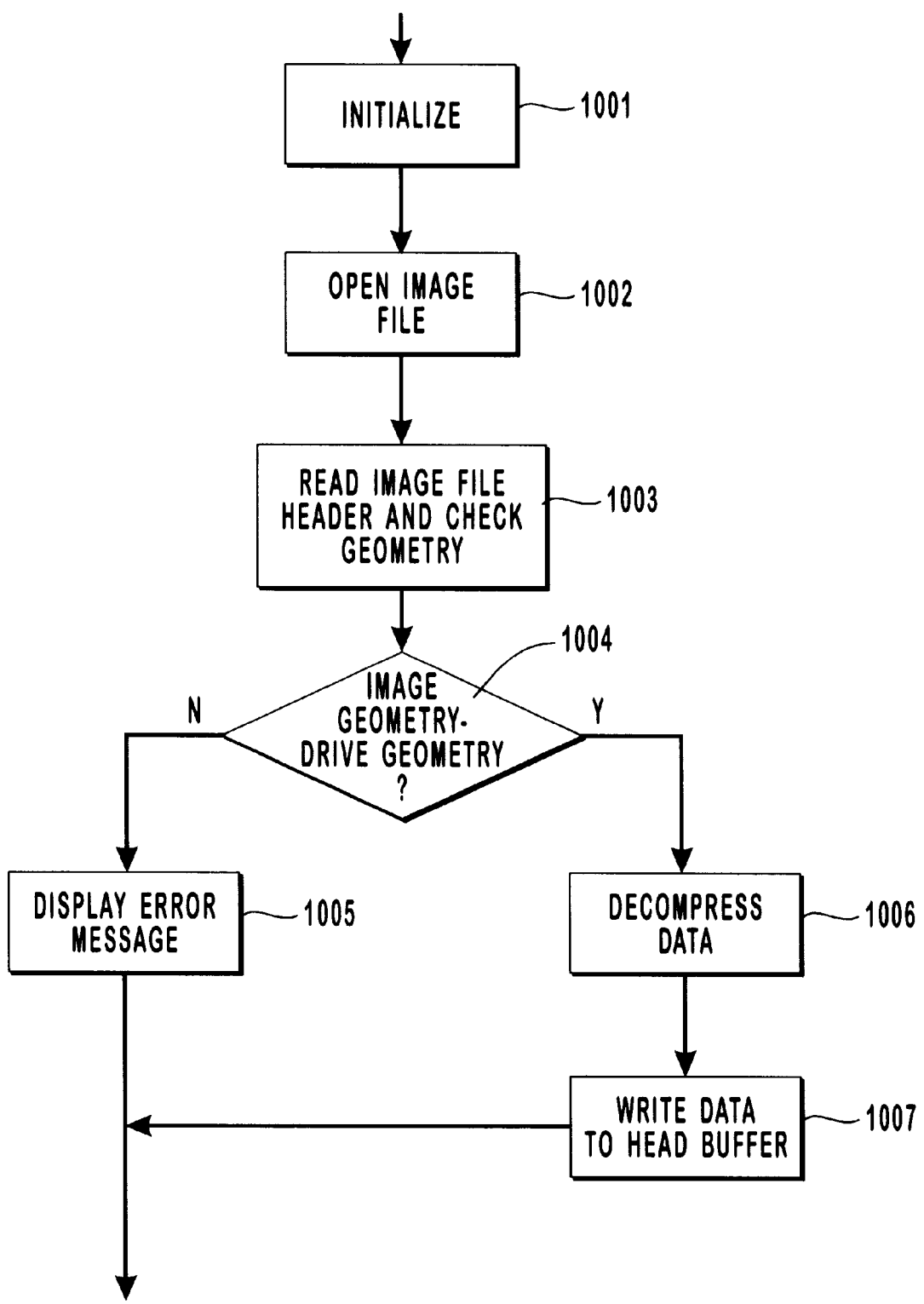
FIG. 10 depicts further detail of the download image step of the master computer component of the invention.

FIG. 10 depicts further detail of the download image step of the master computer component of the invention. This program sub-process of the invention performs the function of downloading the image (disk drive data). If a file name is specified by the operator, it is opened and the disk drive data is read from the file. If the broadcast feature is enabled, the data is broadcast to the image slaves on the network. The first step is to initialize 1001 the needed data and to set the head buffer pointer to 0. Next, an image file is opened 1002 if needed and if the image file name is valid. The image header data is read 1003 and a check is made for the proper drive geometry. If the image geometry is equal to the drive geometry 1004 then the data is decompressed 1006 using well known "Run-Length" decompressions schemes. Once the data is decompressed it is written 1007 to the head buffers. After data is written to the head buffer, this part of the process is complete. If the image geometry does not match the drive geometry, of step 1004, an error message 1005 is displayed.

Figure 11:
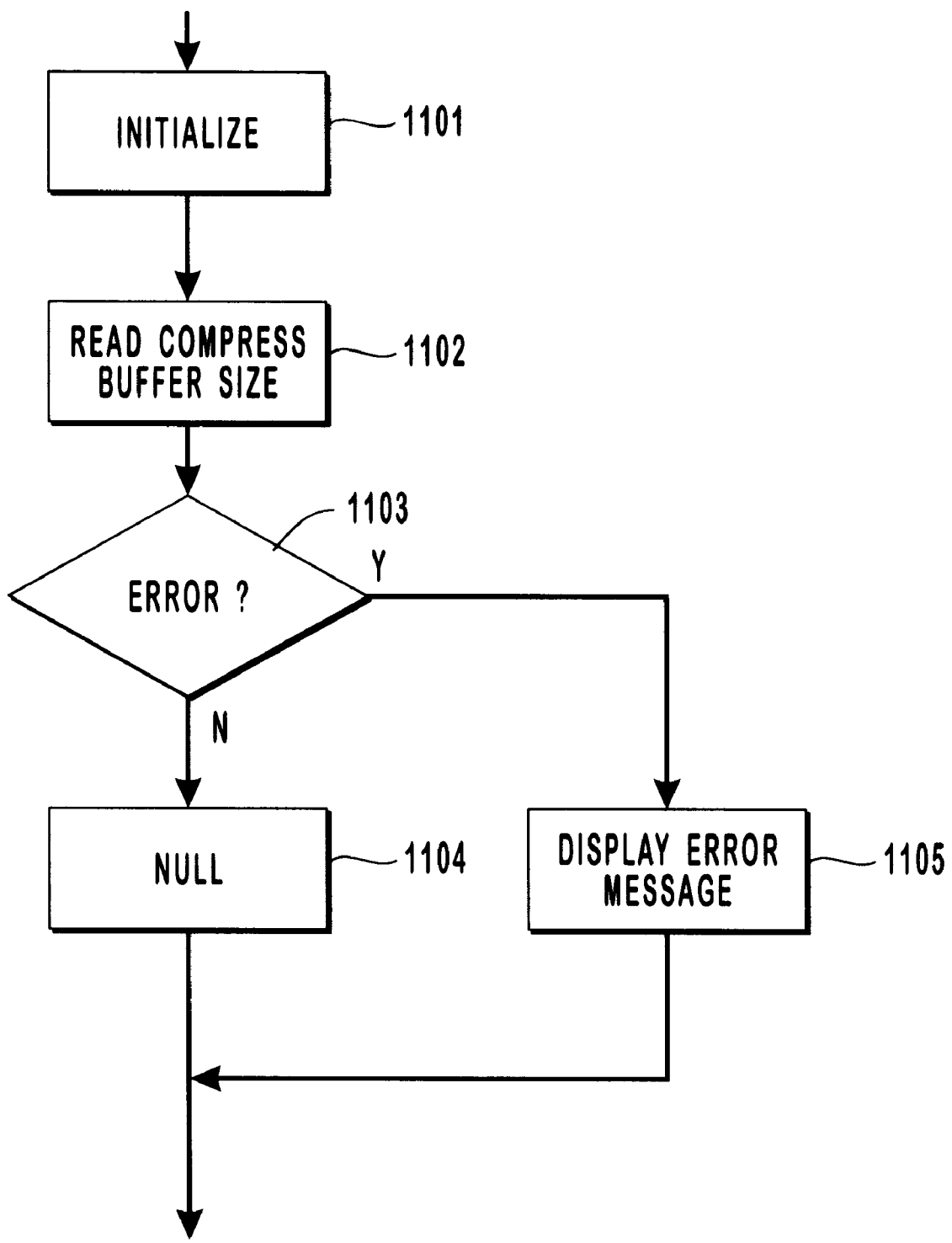
FIG. 11 depicts further detail of the fill compress buffer from file step of the down load image step of the master computer component of the invention.

FIG. 11 depicts further detail of the fill compress buffer from file step of the down load image step of the master computer component of the invention. This function fills the compress buffer by reading a head size (maximum sectors times 512) of data from the image file. If an error occurs during the read, an error message is displayed. First, the data is initialized 1101 to provide data for the process. Next, the compress buffer file size is read 1102 and tested 1103 for error. If an error is encountered, it is displayed 1105, otherwise a null state 1104 is used and the process returns to the download image process of the invention of FIG. 10.

Figure 12:
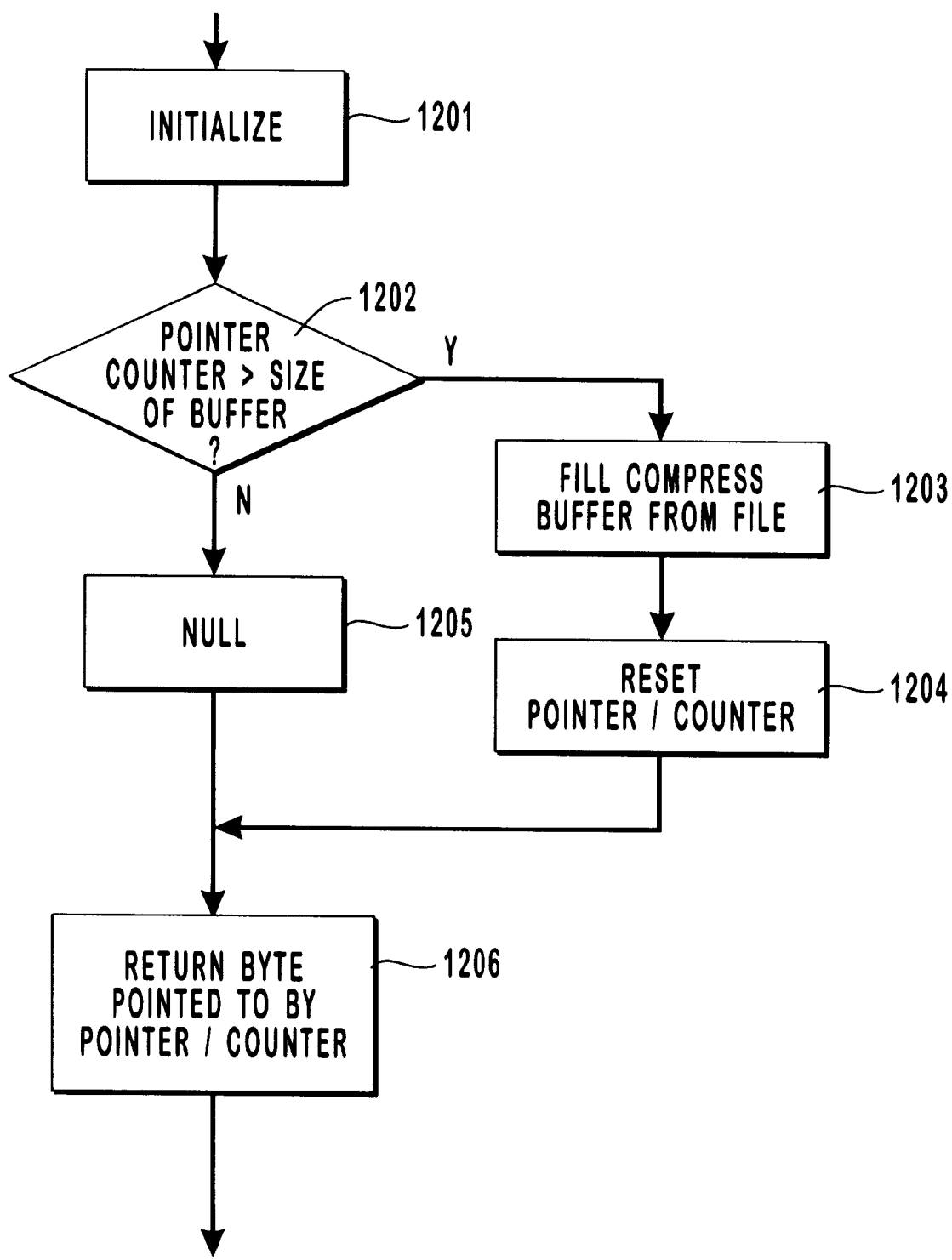
FIG. 12 depicts further detail of the get byte from compress buffer step of the down load image step of the master computer component of the invention.

FIG. 12 depicts further detail of the get byte from compress buffer step of the down load image step of the master computer component of the invention. This process subprogram functions to retrieve a byte from the compress buffer. When the compress buffer is empty, it is refilled by reading data from the image file. First, the data is initialized 1201 for use in the process. Next the compress pointer is tested 1202 to determine if it is greater than the size of the compress buffer. If it is, the compress buffer is filled 1203 from the image file. The compress pointer is then reset 1204. The byte pointed to by the pointer/counter is returned 1206 and the process returns to the download image process of FIG. 10. In the event that the compress pointer does not exceed the size of a buffer, test step 1202, the process goes through a null state 1205 and returns 1206 the byte pointed to by the compress pointer and returns to the download image process.

Figure 13:
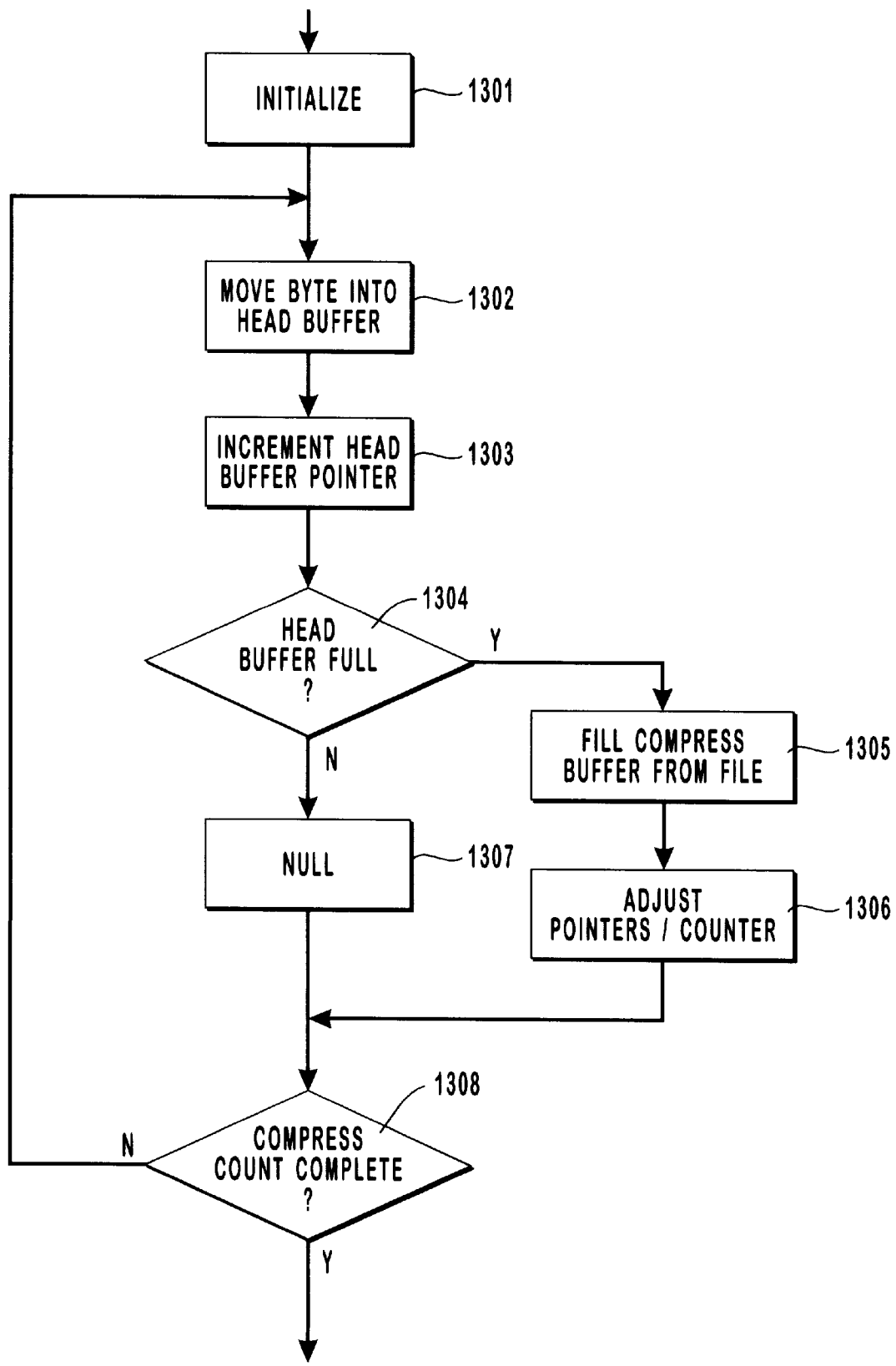
FIG. 13 depicts further detail of the write data to head buffer step of the down load image step of the master computer component of the invention.

FIG. 13 depicts further detail of the write data to had buffer step of the down load image step of the master computer component of the invention. This step functions to take the byte of data passed to it and write it to the head buffer the number of times indicated by the compress counter. This is part of the process of decompressing the image file. When the head buffer is full, it flushes the data to the hard disk drive. First, the data required is initialized 1301. Next, the data is written into the head buffer 1302. The head buffer pointer is incremented 1303. A test 1304 is made to determine whether the head buffer is full. If it is, the head buffer is flushed to disk 1305 and the pointers/counters are adjusted 1306. A test 1308 is then made to determine whether the compress count is complete. If it is, the process returns to the download image of FIG. 10. If it is not, then the process returns to step 1302 to move a byte into the head buffer. If the head buffer, of step 1304, is not full, a null state 1307 is passed through before the compress count test of step 1308.

Figure 14:
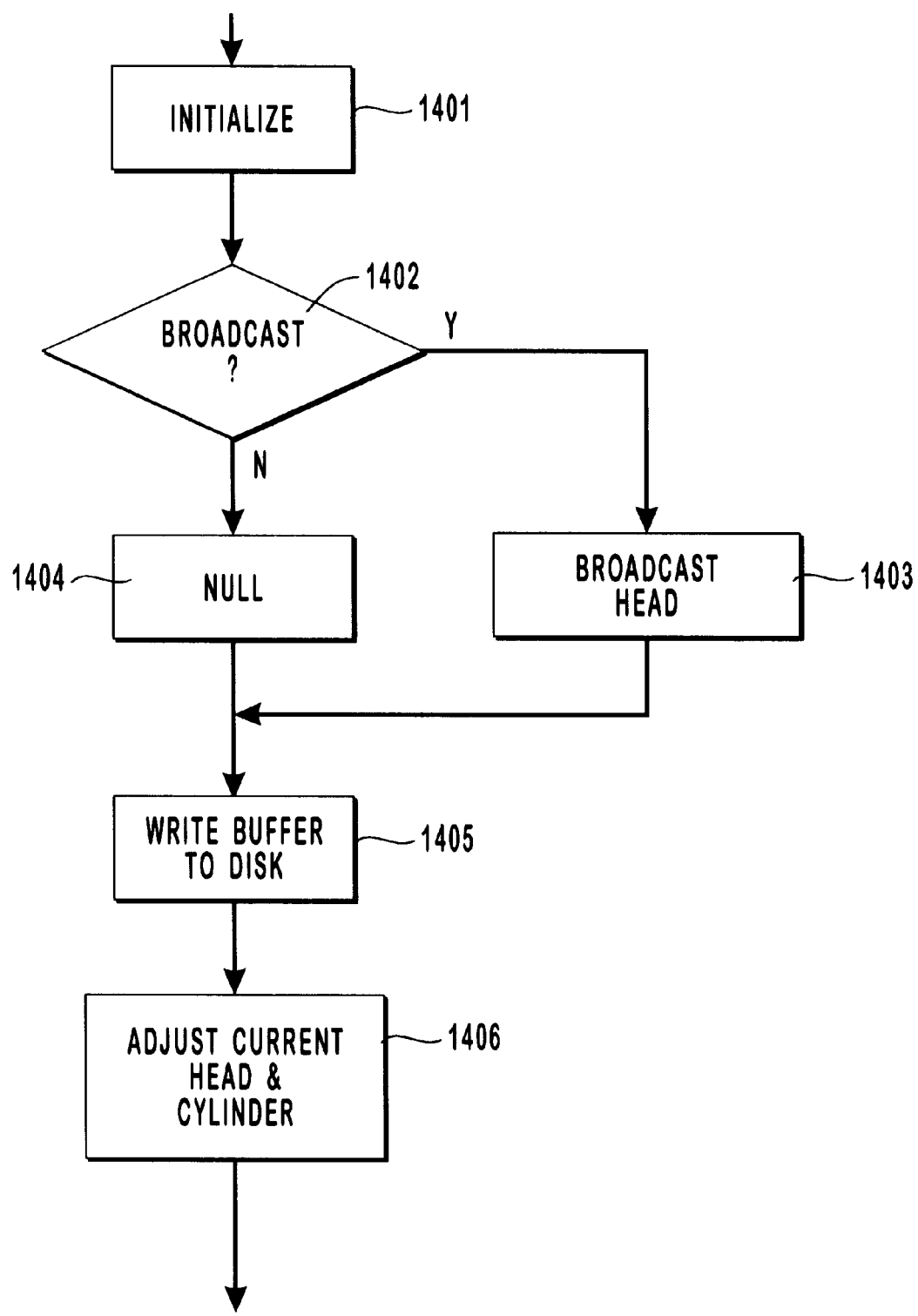
FIG. 14 depicts further detail of the flush head buffer step of the write data to head buffer step of the master computer component of the invention.

FIG. 14 depicts further detail of the flush head buffer step of the write data to head buffer step of the master computer component of the invention. This step functions to flush the head buffer data to disk. The entire head buffer is written in one command. All needed pointers, counters, etc., are updated along with screen information. Also, if the broadcast feature is enabled, the head data is broadcast to the image slaves. First the data is initialized 1401 for use in this process. Next, a test 1402 is made to determine if the process is in the broadcast mode. If it is, the head data is broadcast 1403 to all image slave computers. If not, the process goes through a null state 1404. The head buffer is then written 1405 to disk and the current head and cylinder data is adjusted 1406 prior to returning to the write data to head buffer process of FIG. 13.

Figure 15:
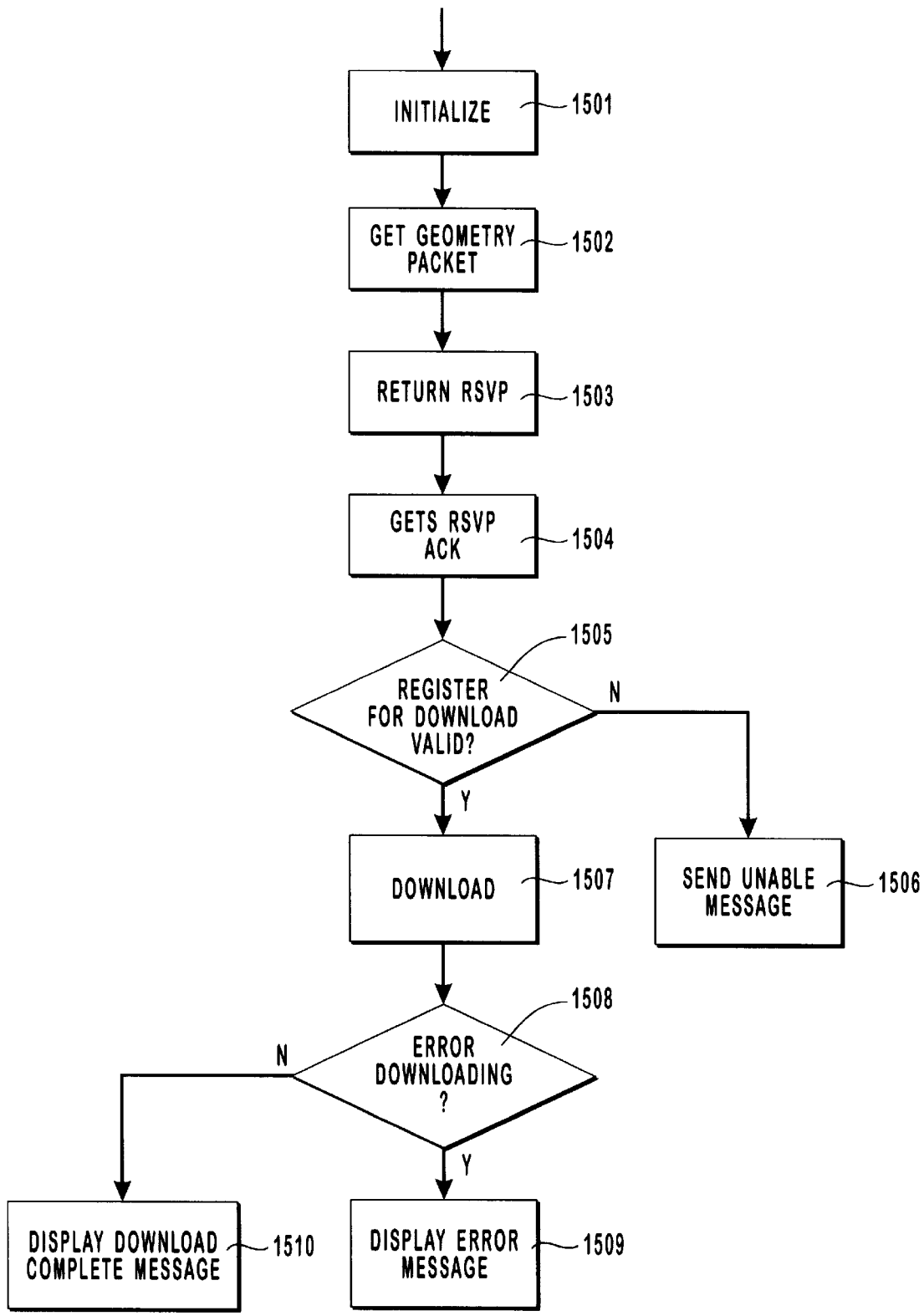
FIG. 15 depicts a flow chart diagram of the slave component of the invention, which is a detailed flow diagram of the current preferred embodiment of the Slave computer process of the invention.

FIG. 15 depicts a flow chart diagram of the slave component of the invention. is a detailed flow diagram of the current preferred embodiment of the Slave computer process of the invention. The IMGSLAVE is the slave component or process of the invention that provides the parallel disk image process. The slave uses an IPX socket to listen for data from the image master. A special header in the data from the master determines the function the slave will perform. The IMGSLAVE program cannot create or restore an image without the IMGBLSTR program. Its function is to listen to the network for data from the IMGBLSTR, to retrieve data from the network and to write it to the slave's local drive. The slave process begins by initializing 1501 data for processing. When a geometry packet is received 1502 from the master the slave responds with an RSVP 1503. Next, the slave listens for an RSVP acknowledge 1504 from the master. After the receipt of the RSVP acknowledge, a test 1505 is made to determine whether the register for download is valid, if not, a message indicating that the transfer is unusable is sent 1506. Alternatively, if the register for download is valid, then the data is downloaded 1507 to the slave. Error checking 1508 is performed and errors are displayed 1509 if detected. If no errors are detected, a download complete message is displayed 1510.

The following is a listing of the computer source code which is the current best mode preferred embodiment of the invention. The reader can, by consulting this source code, learn all that is necessary to produce and use the invention.

The previous description, including the listed source code, describes the current preferred best mode embodiment of the invention as it is performed on personal computers connected through a computer network with or without a computer server. The software programs which are used to practice this invention typically reside in the memory and/or hard disk storage medium of the networked computers. While the current best mode of the invention is used on personal computers, it is not necessary that it be limited in this way. Any computational device which has a long term storage medium, for example: a disk drive, a tape drive, a CD or optical storage medium; and can be networked to other computational devices. The size, configuration or purpose of the computational device does not limit the use of this invention to image long term stored data from one computational device to another in either a peer-to-peer mode or a client/server mode of operation. Furthermore, while this invention is performed, in its current best mode, by software written in the C programming language, alternative computer languages can equivalently used. The software source code provided as part of the disclosure of this patent application, shows in detail how the functional steps of the invention are performed. Of course, it is contemplated that the inventive concept of this invention may be implemented through other techniques and in other embodiments and in other computer languages. The computer source code is provided to describe the best mode of operation of the invention, such a best mode may evolve and change over time, after the filing of this application without altering the fundamental inventive concept of the method, which is the imaging of computer data from one computer to one or more others over a network using a peer-to-peer method and still remain compatible with a client/server mode of operation, without requiring special purpose network server hardware.

We claim:

1. A method for imaging data between two or more digital computer systems across a computer network the method steps comprising:

(A) networking a master computer to a first slave computer and a second slave;

(B) initiating the imaging of data on said master computer; and (C) responding to the requests for data imaging from said master computer on said first slave computer and said second slave computer.

2. A method for imaging data between two or more digital computer systems across a computer network, as recited in claim 1, where said initiating the imaging of data step further comprises the steps of:

(1) determining the type of imaging which is desired between the computer systems;

(2) transferring the image data between said slave computer and said master computer; and (3) broadcasting the transferred image data from a single master computer system to more than one slave computer system.

3. A method for imaging data between two or more digital computer systems across a computer network, as recited in claim 1, wherein said initiating the imaging of data step further comprises the steps of:

(1) receiving computer system information from said master computer;

(2) transmitting said received computer system information, wherein said computer system information includes handshaking information, to said master computer;

(3) downloading said transferred image data from said master computer and to said slave computer and for storing the image data in a digital computer system; and (4) handling errors incurred in the downloading of the image data from said master computer.

4. A method for imaging data between two or more digital computer systems across a computer network, as recited in claim 2, wherein said determining the type of imaging step which is desired between the computer systems, further comprises the steps of:

(a) processing command line information from the system operator; and (b) processing menu information for gathering necessary information from the system operator and the digital computer systems.

5. A method for imaging data between two or more digital computer systems across a computer network, as recited in claim 2, wherein said transferring image data between said slave computer and said master computer step, further comprises the steps of:

(a) opening a file containing the data to be imaged;

(b) writing an image header for recording the image header data;

(c) retrieving image data into a computer system; and (d) minimizing the data storage requirements of the retrieved image data.

6. A method for imaging data between two or more digital computer systems across a computer network, as recited in claim 2, wherein said broadcasting the transferred image data step, further comprises the steps of:

(a) packaging digital computer system sector data; and (b) sending said packaged digital computer system sector data across a network to one or more digital computer systems.

7. A system for performing peer-to-peer imaging of information stored in a digital computer storage media across a digital computer network comprising:

(A) a first digital computer system having a first disk drive;

(B) a second digital computer system having a second disk drive and a third digital computer system having a third disk drive;

(C) a network communication device electrically connecting said first digital computer system to said second digital computer system; and (D) a means for simultaneously imaging data stored on said first digital computer system to said second digital computer system and said third digital computer system thereby duplicating all data stored on said first disk drive of said first digital computer system to said second disk drive on said second digital computer system and to said third disk drive on said third digital computer system.

8. A system for performing peer-to-peer imaging of information stored in a digital computer storage media across a digital computer network, as recited in claim 7, further comprising:

(F) a third digital computer system; and (G) a means for broadcasting image data stored on said first computer system to said second digital computer system and said third digital computer system.

9. A system for performing peer-to-peer imaging of information stored in a digital computer storage media across a digital computer network, as recited in claim 7, further comprising:

(H) a means for compressing the volume of information to be imaged.

10. A system for performing peer-to-peer imaging of information stored in a digital computer storage media across a digital computer network, as recited in claim 7, wherein said system is operable in a client/server network environment.

11. A system for performing peer-to-peer imaging of information stored in a digital computer storage media across a digital computer network, as recited in claim 7, wherein said system is operable in a network without electronic server hardware.

12. A networked computer system comprising:

(A) a means for initializing variables for use by a software program for performing data imaging on digital computers across a computer network;

(B) a means for selecting the type of imaging of the digital computer data;

(C) a means for uploading to simultaneously transfer digital computer data from one digital computer to two or more other digital computers, wherein each digital computer operates in a peer-to-peer mode;

(D) a means for downloading to receive data from a digital computer to another digital computer; and (E) a means for error detection and reporting for identifying and reporting any errors that occur during said upload or said download routines.

* * * * *